United States Patent
Kozloski et al.

(12) 
(10) Patent No.: US 9,417,928 B2
(45) Date of Patent: Aug. 16, 2016

(54) ENERGY EFFICIENT SUPERCOMPUTER JOB ALLOCATION

(71) Applicant: International Business Machines Corporation, Armonk, NY (US)

(72) Inventors: James R. Kozloski, New Fairfield, CT (US); Timothy M. Lynar, Kew (AU); Mark D. Nelson, Austin, TX (US); John M. Wagner, Carlton (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/582,297

(22) Filed: Dec. 24, 2014

(65) Prior Publication Data

US 2016/0188375 A1 Jun. 30, 2016

(51) Int. Cl.
G06F 9/50 (2006.01)
G06F 15/82 (2006.01)
G06F 9/48 (2006.01)
G06F 9/46 (2006.01)

(52) U.S. Cl.
CPC .............. *G06F 9/5077* (2013.01); *G06F 9/461* (2013.01); *G06F 9/4893* (2013.01); *G06F 9/5016* (2013.01); *G06F 15/825* (2013.01)

(58) Field of Classification Search
CPC .................................................. G06F 9/5077
See application file for complete search history.

(56) References Cited

U.S. PATENT DOCUMENTS

| 6,829,765 | B1 | 12/2004 | Chan et al. |
| 8,230,432 | B2 | 7/2012 | Bryant et al. |
| 8,510,590 | B2 | 8/2013 | Ji et al. |
| 8,516,487 | B2 | 8/2013 | Felton et al. |
| 2005/0071843 | A1 | 3/2005 | Guo et al. |
| 2006/0167984 | A1* | 7/2006 | Fellenstein ........... G06F 9/5072 709/203 |
| 2008/0294872 | A1 | 11/2008 | Bryant et al. |
| 2011/0197196 | A1 | 8/2011 | Felton et al. |
| 2012/0185709 | A1* | 7/2012 | Weissmann ........... G06F 1/3234 713/320 |
| 2012/0284549 | A1* | 11/2012 | Abdul .................. G06F 9/5077 713/323 |
| 2012/0331147 | A1 | 12/2012 | Dutta et al. |
| 2013/0219043 | A1 | 8/2013 | Steiner et al. |
| 2013/0311539 | A1 | 11/2013 | Ngai et al. |

OTHER PUBLICATIONS

Lovasz, G., et al. "Energy-Efficient and Performance-Conserving Resource Allocation in Data Centers". Proc. of the COST Action IC 0804 on Energy Efficiency in Large Scale Distributed Systems—2nd Year. COST Office, 2011.

Sridharan, M., et al. "Defragmentation of Resources in Virtual Desktop Clouds for Cost-Aware Utility-Optimal Allocation". 2011 Fourth IEEE International Conference on Utility and Cloud Computing. Copyright 2011 IEEE. pp. 253-260.

* cited by examiner

*Primary Examiner* — Hiren Patel
*Assistant Examiner* — Charlie Sun
(74) *Attorney, Agent, or Firm* — John W. Hayes; William H. Hartwell

(57) ABSTRACT

A technique for defragmenting jobs on processor-based computing resources including: (i) determining a first defragmentation condition, which first defragmentation condition will be determined to exist when it is favorable under a first energy consideration to defragment the allocation of jobs as among a set of processor-based computing resources of a supercomputer (for example, a compute-card-based supercomputer); and (ii) on condition that the first defragmentation condition exists, defragmenting the jobs on the set of processor-based computing resources.

12 Claims, 4 Drawing Sheets

ENERGY EFFICIENT SUPERCOMPUTER JOB ALLOCATION

BACKGROUND

The present invention relates generally to the field of "job" (see Definition in Definitions sub-section, below) allocation over a set of "processor-based computing resources" (see Definition in Definitions sub-section, below), and more particularly to job allocation where performance of the jobs requires and/or produces energy (for example, electrical energy, thermal energy).

Some conventional supercomputers are built up from a single fundamental computing resource unit, called the compute card (sometimes herein referred to as compute-card-based supercomputers). In some conventional compute-card-based supercomputers, compute nodes are packaged two per compute card, with 16 compute cards plus up to 2 I/O (input/output) nodes per node board.

In some compute-card-based supercomputers, compute cards are then grouped together, 32 per node board to form midplanes, with each midplane having 16 node boards. Two midplanes a rack provide 1024 compute cards with a total of 16384 cores. Most supercomputers support compute jobs of varying sizes (number of compute nodes) and varying duration. This often results in "fragmentation in the processor-based computing resources" over time. "Fragmentation in the processor-based computing resources" means a job becomes sub-divided into smaller and smaller "job fragments" (see definition, below), which generally are intermingled throughout the set of processor-based computing resources with job fragments from other jobs.

SUMMARY

According to an aspect of the present invention, there is a method, computer program product and/or system that performs the following steps (not necessarily in the following order): (i) computing, by job predicting machine logic, a first cost approximation associated with running a first job on a supercomputer, with the computation of the first cost approximation being performed under an assumption that no defragmentation is performed prior to running the first job; (ii) computing, by the job predicting machine logic, a second cost approximation associated with running the first job on the supercomputer, with the computation of the second cost approximation being performed under an assumption that defragmentation of a first partition of the supercomputer is performed prior to running the first job; and (iii) on condition that the first cost approximation is greater than the second cost approximation, performing defragmentation of the first partition. The first partition is a partition large enough to run the first job.

DETAILED DESCRIPTION

Figure 1:
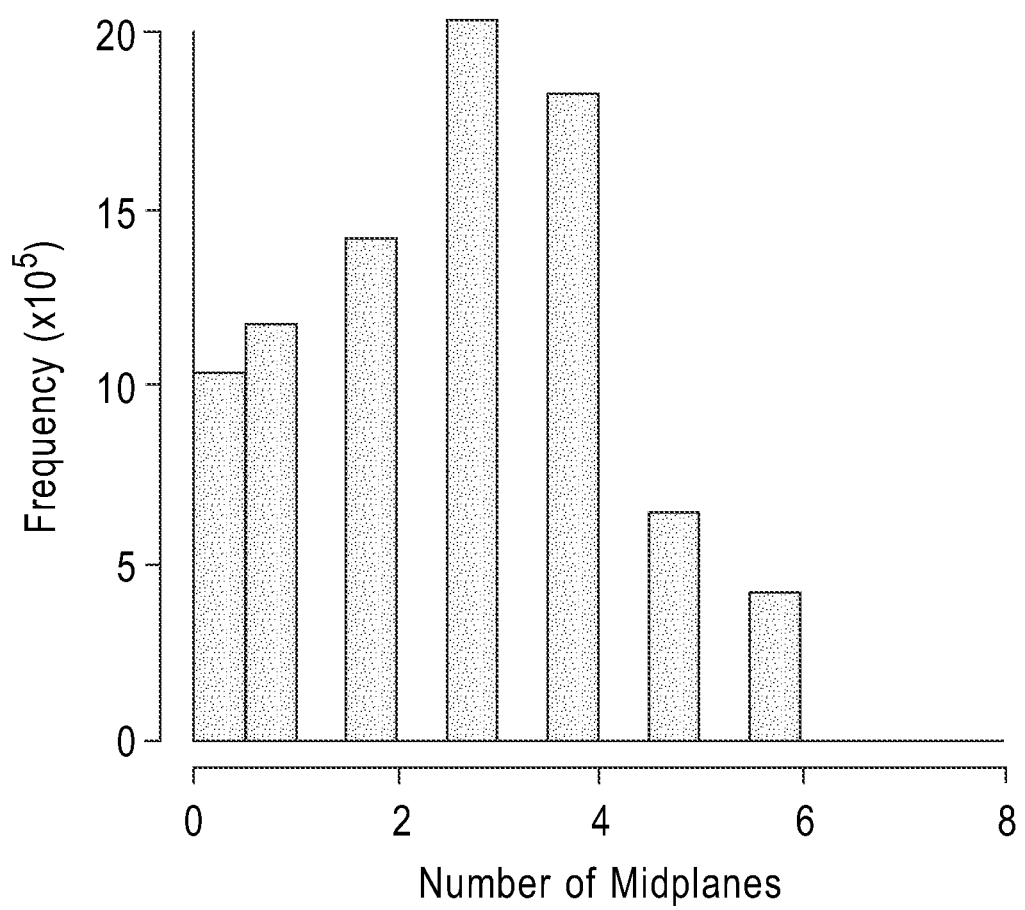
FIG. 1 is a graph showing information that is generated by and/or helpful in understanding embodiments of the present invention.

Some methods according to the present invention perform the following operations: (i) determine a first defragmentation condition, which first defragmentation condition will be determined to exist when it is favorable under a first "energy consideration" (see definition, below) to defragment the allocation of "jobs" (see definition, below) as among a set of "processor-based computing resources" (see definition, below) of a supercomputer (for example, a compute-card-based supercomputer); and (ii) on condition that the first defragmentation condition exists, defragment the jobs on the set of processor-based computing resources. Some embodiments of the present invention may minimize energy consumption.

Some embodiments of the present invention recognize the following facts, potential problems and/or potential areas for improvement with respect to the current state of the art: (i) in the case of a very highly used machine, fragmentation can prevent jobs from running purely because there is not a sufficiently sized contiguous block of compute resources available, even though the total amount of idle compute resources may be larger than what the job requires; and/or (ii) under conventional technology, the issue of insufficiently sized contiguous blocks (mentioned in the previous item on this list) are handled by a technique called machine defragmentation (specifically, jobs are "checkpointed" and restored in a new configuration on the machine to free larger contiguous blocks).

"Checkpointing" means that a set of data related to job performance status is collected and saved in a data set which is called a "snapshot." The "snapshot" includes sufficient information to restart the job so that little or no data processing progress is lost as between the checkpointing and the restart of the job. In other words, checkpointing effectively inserts fault tolerance into a supercomputer. Checkpointing includes: (i) storing a snapshot of the current application state; and (ii) later on, uses it for restarting the execution. In this way, checkpointing and snapshotting can be used to implement job defragmentation. As a general principle, moving jobs between machine partitions depends, at least to some degree, upon the use of a storage medium to store and/or communicate between partitions to transmit a job in a serialized, non-running state.

In some embodiments in accordance with the present invention, the process of job fragment consolidation involves the following steps: (i) jobs are paused in the source partition; (ii) memory states associated with jobs are serialized to a transmittable storage medium; (iii) memory states are transmitted to the new destination partition; (iv) memory in the destination partition is reconstructed from the serialized memory transmission; and (v) the job is resumed on the new partition.

Energy minimizing job scheduling on a parallel resource will now be discussed. Through a combination of intelligently placing compute jobs on supercomputers and by the use of a checkpoint/restart mechanism for already running compute jobs, a resource manager can pack tasks to maximize contiguous areas of idle compute resources such that they can enter a low power state. The checkpoint/restart mechanism may not be supported on all compute workloads, but those that can write their state out to some persistent data store. The saving of state is required so that it may be read back in the future to enable computation to continue at the previously written out point can be checkpointed and then restarted on to another part of the computer. This allows the movement of compute jobs between different parts of the machine.

Some embodiments of the present invention provide a system and method for detecting when it is desirable from an energy standpoint to defragment the computing resource and subsequently perform the defragmentation. From a high level perspective it is desirable to defragment when the following inequality holds:

[direct energy costs+the cost of lost cycles]<predicted energy saved from the action.

The costs of defragmenting the computing resource is the opportunity cost (the cost of lost cycles) and direct energy costs of performing the action.

The opportunity cost is the delayed work progress associated with the computational time lost as a result of the checkpoint and restart process as this computational time will need to be made up at a later point, resulting in an increase in total wall time for all relocated compute jobs.

The direct energy costs are those attributed to calculating when, what, and how to perform the checkpoint, the action of checkpointing, and the action of restarting compute jobs that have been moved. It should be noted that serialization of a memory to a storage medium, transmission, and restoration to a new memory all make use of electricity in contemporary computers.

The predicted energy saved is calculated by the difference in non-productive power consumption in the compute system without defragmentation compared with the predicted non-productive power consumption with defragmentation, multiplied by the expected runtime of the defragmented state, less the energy used to defragment. Non-productive power consumption is the power that is used by compute resources that are idle.

Predictive modeling of non-productive power consumption after defragmentation will now be discussed. A problem arises when predicting how much non-productive power consumption after defragmentation can be eliminated by an earlier defragmentation and powering down of non-productive partitions. The associated cost savings is therefore affected by this problem as well. The problem derives from the original problem defragmentation was intended to address in the prior art, that of freeing contiguous blocks so that larger jobs may run as soon as possible. The assumption is that any owner of a parallel resource will maintain this objective, independent of energy consumption, since the opportunity cost of not running a large job is high, and cost of defragmentation is sunk at the time of job submission.

Therefore, in the event that a larger job is submitted after defragmentation occurs, but before the predicted non-productive power consumption without defragmentation is recouped (i.e., in the event the expected runtime of the predicted state, which includes powered down machine partitions, is never achieved), the job will run and the energy savings of defragmentation will not be realized. Again, the cost of defragmentation must be recouped during the runtime of the predicted state for an energy savings to occur, and if it is not, the new job will cause a net increase in energy cost as opposed to a savings.

To address this issue, use is made of a modeling component, which requires anticipated users of large blocks on the system to predict their job runtimes well in advance of the job being submitted. These users are asked daily to update these anticipated runtimes, based on the progress of their development efforts. The system makes use of these and other inputs, together with machine learning inference, to estimate the probability that a job will run at a specific time. These inferred probabilities are incorporated into the above inequality criterion for initiating defragmentation, by calculating the predicted energy saved from the action using a dynamically updated predicted runtime of the defragmented state. The system learns based on the objective of accurately predicting these runtimes, subject to a highly nonlinear cost function, which attempts to minimize the risk that the cost of defragmentation is not recouped.

The modeling component may include the following machine learning elements: (i) active learning, in which a user is asked to provide feedback on the prediction made based on inference; (ii) continual updates of the model based on user input and questionnaire submission; (iii) analysis of a user's set criteria for running a job such as code compilation, data movement, time of day, etc.; (iii) inputs from the user's calendar, including meeting schedule, time allocated to development and experimentation, etc.; and (iv) crowd-sourced estimates from the user's team and management, who may have insight into when a particular job may run, or how productive a user is currently in achieving a set target for job submission.

Figure 2:
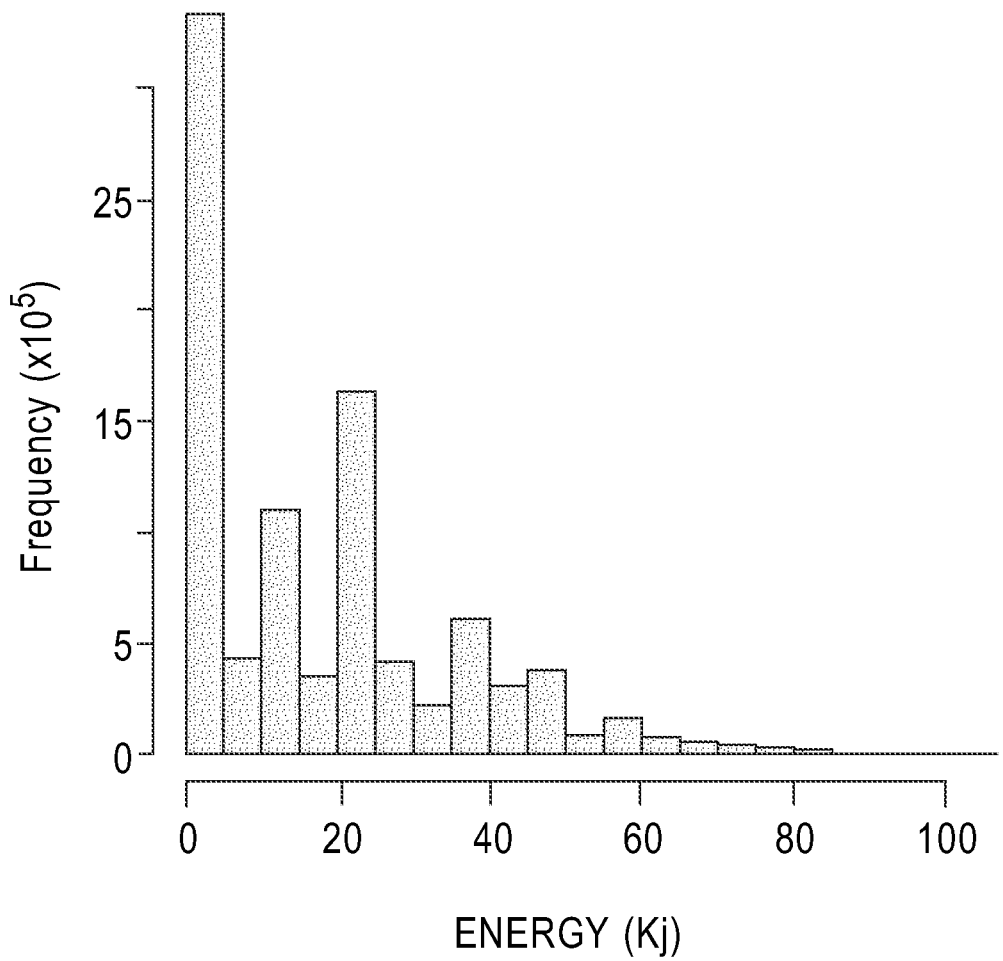
FIG. 2 is a graph showing information that is generated by and/or helpful in understanding embodiments of the present invention.

As shown in FIG. 1, graph 100 shows midplanes processing by showing the number processing, by frequency. As shown in FIG. 2, graph 200 shows power used by booted, idle node boards to effectively show energy as a function of frequency. Several methods, according to the present invention, will be discussed in the following paragraphs. In each method, job allocation among and between the set of processor-based computing resources of the supercomputer needs to be determined.

The first example method is the "move largest elements first Method," as follows: (i) identify free resources at each level; (ii) calculate processing value for each rack (in this example, the number of processing compute cards); and (iii) perform the pseudo code set forth below:

```
FOR EACH resource type (largest first) {Midplane,
Node board, Compute card}
    IF the resource P is processing THEN
        IF there is an identified free resource F of this
        type THEN
            IF the resource F is located on a parent
            resource that has a higher processing value than
            the parent resource of P THEN
                Record action to move the jobs on resource
                P to resource F
                Update processing value
            END IF
        END IF
    END IF
END FOR EACH
```

The second example method is called the "marginal energy cost method," and is as follows: (i) the marginal energy cost, calculated on each predicted state between defragmentation intervals, is defined as the difference in power consumption of a rack when a particular compute card is processing compared to the power consumption of that rack if that compute card were not processing, multiplied by the length of that state; (ii) on condition that the predicted marginal energy saving is greater than the predicted marginal energy cost of moving the resource: (a) move largest marginal energy users first, and (b) calculate the marginal energy cost of each compute card using the following pseudo code:
FOR EACH processing compute card P (in descending order of cost)

Move jobs from P to the lowest marginal energy cost available compute card

END FOR EACH

It is possible that it is more beneficial to free three compute cards on one node board than it is to free one compute card on another node board, even if both free the entire node board. This is because the value of freeing a node board depends on whether freeing that node board will free a whole midplane of node boards, or make it more likely that a midplane of node boards will be able to be freed in the future.

According to a third example method, a packing algorithm is used to calculate the optimal placement of each task within the super computer at each point in time. This is accomplished using a bin packing algorithm, or other mathematical optimization technique, as implemented by one skilled in the art. This method may include the following steps: (i) calculate a power optimal placement of nodes using a bin-packing algorithm; (ii) calculate the energy saved as the difference in energy usage multiplied by the expected time until next state change (or calculate the energy saved as the difference in energy usage multiplied by the time until powered down partitions are restored to service a large job); (iv) if the energy saved by the optimal placement of VMs—the cost of defragmenting the computing resource is greater than zero (0), perform the defragmentation.

Some embodiments of the present invention may include one, or more, of the following features, characteristics and/or advantages: (i) machine logic that takes account of the estimated or known energy required to store and retrieve a job from checkpoint; (ii) machine logic that takes account of the estimated or known runtime of a job; (iii) machine logic that takes into account the different levels of power saving are achievable by shifting load to different parts of the machine; (iv) machine logic that takes into account communication network constraints; (v) machine logic that that uses MIP (mixed integer programming) to solve the allocation problem.

Some embodiments of the present invention may include one, or more, of the following features, characteristics and/or advantages: (i) detect when it is energy efficient to relocate jobs in a supercomputer through checkpointing and restarting; (ii) checkpointing and restarting compute jobs in a supercomputer, so as to maximize the number of compute resources that can be placed into a low power state; (iii) determination of when it is energy efficient to checkpoint and restart compute jobs in a supercomputer so as to maximize the number of compute resources that can be placed into a low power state; (iv) exhaustive search is used to determine the optimal placement of tasks on resources; (v) a bin packing algorithm is used to determine the optimal placement of tasks on resources.

Another example embodiment of a system and method according to the present invention will now be discussed. This system, and associated method, minimizes power consumed and maximizes available partition sizes available in a supercomputing facility by taking inputs from a job predicting component, scheduling machine defragmentation, and powering down unused partitions. This example method includes the following operations: (i) job predicting component (JPC) takes as input calendar entries from calendars of users of the supercomputing facility specifying users' expected run times for jobs of various sizes; (ii) system computes an expected time for a need for machine defragmentation (ETD), based solely on the projected unavailability (due to machine fragmentation) of a partition large enough for a job predicted by JPC; (iii) system computes a cost incurred for the expected delay of the large job if no defragmentation is performed (R); (iv) system computes the maximum expected runtime RTD (i.e., maximum interval ending at ETD) for the machine in a defragmented state with free partitions Pn of various sizes if machine defragmentation occurs prior to ETD, based solely on the projected submission of small jobs prior to ETD; (v) system computes the cost savings Q by subtracting the cost of power required for defragmentation from the savings accrued by powering down Pn over RTD; (vi) if Q>R, defragmentation is scheduled for time ETD-RTD, else no defragmentation occurs.

Some embodiments of the present invention may include one, or more, of the following features, characteristics and/or advantages: (i) a system and method for performing energy efficient super computer allocation; (ii) in various embodiments, there are many algorithms one might apply to make the JPC optimal in its ability to predict when jobs will run; (iii) calendars as one of many possible inputs to the JPC; (iv) a novel set of steps, that results in power savings and cost of delayed jobs being balanced when one considers early defragmentation and powering down free partitions an option; and/or (v) coupling a power-aware scheduling method in a system where work must be scheduled to contiguous partitioning, and the consequent checkpointing/restart process to relocate work to take advantage of that power-aware scheduling.

Figure 3:
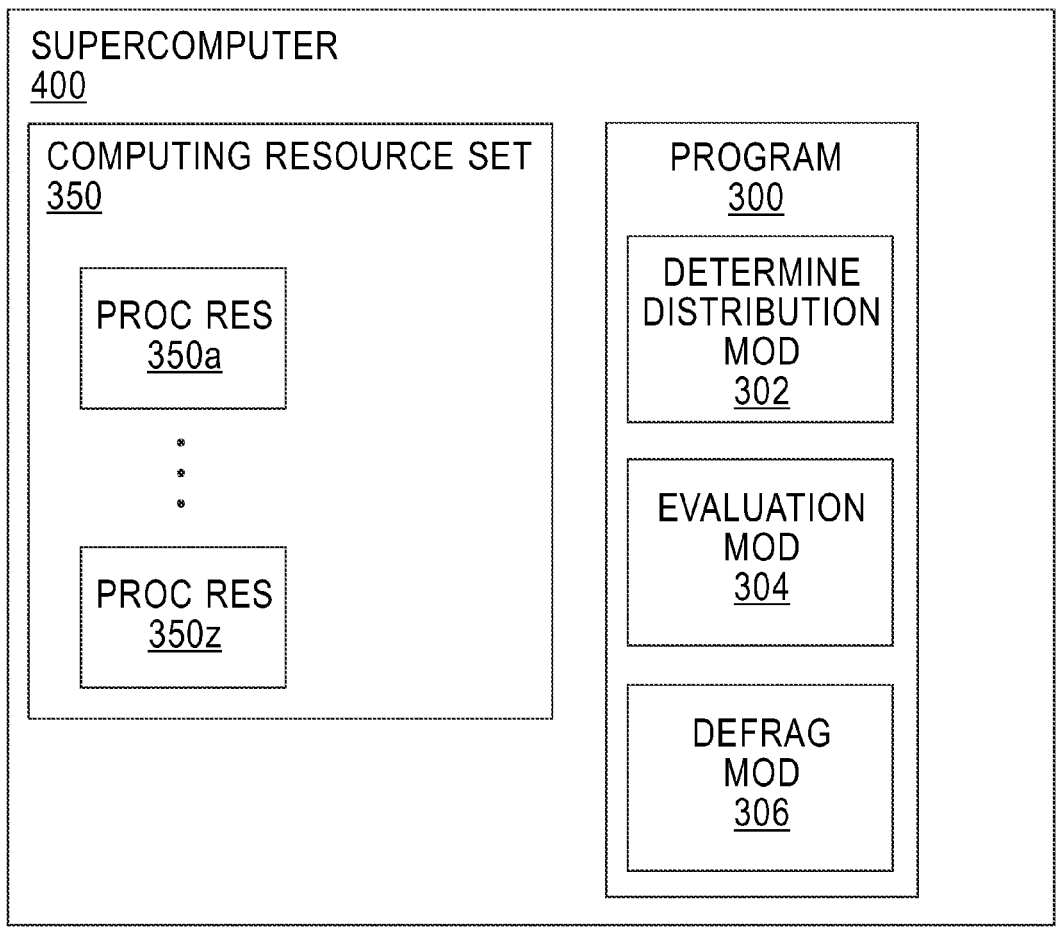
FIG. 3 is a block diagram of a first embodiment of a supercomputer system according to the present invention.
Figure 4:
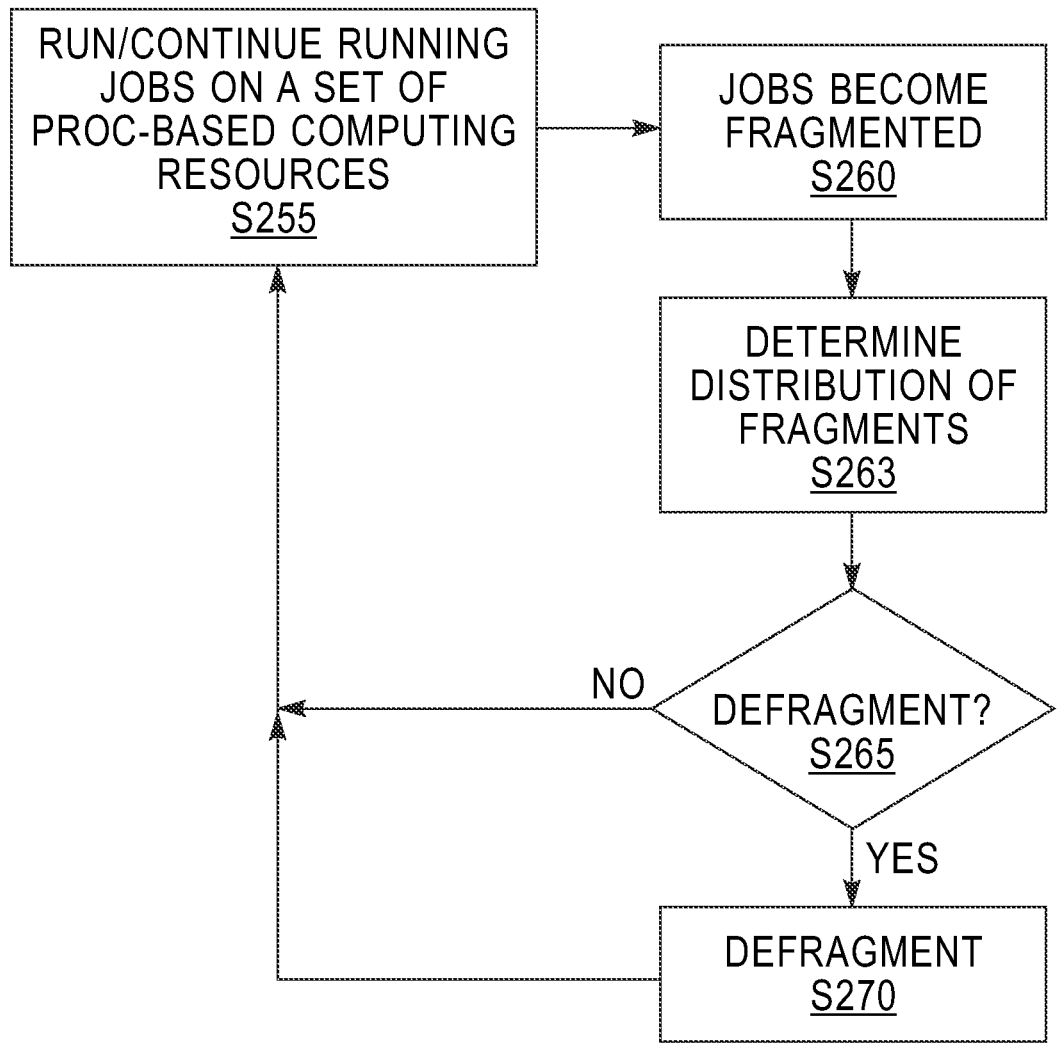
FIG. 4 is a flow chart showing a first embodiment of a method according to the present invention.

As shown in FIG. 3, supercomputer 400 includes: processor-based computing resource set 350 (including processor-based computing resources 350$a$ to 350$z$); and program 300. Program 300 includes determine distribution module ("mod," see definition, below) 302; evaluation mod 304; and defrag mod 306. It should be understood that processor-based computing resources set 350 includes storage and/or memory resources that are subject to partitioning into smaller and smaller logical segments. This partitioning will become relevant in the discussion of FIG. 4, which shows flow chart 250 representing a method, according to the present invention, performed by program 300 on supercomputer 400. This method will be described in detail in the following paragraphs, with reference to FIGS. 3 and 4. Processing begins at step S255, where a set of supercomputer "jobs" (see definition, below) are run on processor-based computing resources 350$a$ to 350$z$. In this embodiment, this step is similar to the way that conventional jobs are run on conventional supercomputers.

Processing proceeds to step S260, where the jobs become fragmented between and among processor-based computing resources 350$a$ to 350$z$. The information about how job fragments are distributed between and among the processor-based computing resources will herein sometimes be referred to as the "fragmentation state" of the jobs over the resources.

Processing proceeds to step S263, where determine distribution mod 302 determines the current fragmentation state of the jobs over the resources.

Processing proceeds to step S265, where evaluation mod 304 determines whether a defragmentation condition exists as the system is in its current fragmentation state. This defragmentation condition is based on an "energy consideration" (see definition, below). As explained above, in some embodiments, the energy consideration will be the possibility of lowering the power state (for example, turning off) certain processor-based computing resources and/or "partitions" made up of processor-based computing resource(s).

At the time step S265 is performed by the machine logic (for example, software) of evaluation mod 304, the processor-based computing resources set has reached a fragmentation state that includes some relatively small number of partitions Pn on, among and between the computing resources. Running a large job while using the small partitions will take extra time and energy, relative to running that same large job on a single large partition. On the other hand, in order to create a large partition, capable of running the large job without substantial use of other partitions that may exist in the resource set, at least some defragmentation must occur. This defragmentation, if undertaken, also costs in terms of time and energy—and these costs include not only a delay in starting the large job, but also disruption for smaller jobs being run on supercomputer 400. As will now be discussed in the following paragraph(s), step S265 determines whether it is better to: (i) forego the defragmenting and associated creation of the large partition for running the large job; or (ii) perform the defragmentation prior to running the large job.

Step S265 computes a first cost approximation associated with running the large job on supercomputer 400. This computation of the first cost approximation is performed under an assumption that no defragmentation is performed prior to running the first job, meaning that the large job will be run after relatively small partitions of the un-defragmented partition set Pn are freed by completion of small jobs running on these partitions. Step S265 further computes a second cost approximation associated with running the large job on the supercomputer. This computation of the second cost approximation is performed under an assumption that defragmentation is performed to an extent that a relatively large partition is created in resource set 350 so that the large job can run at least substantially entirely using the relevant resources of the first partition. If the first cost approximation is greater than the second cost approximation, then processing proceeds to step S270 (further discussed, below). If the first cost approximation is less than the second cost approximation, then processing loops back to step S255.

At step S265, the computation of the first cost approximation is based, at least in part, upon opportunity costs associated with delaying running the large job without defragmentation, and the computation of the second cost approximation is based, at least in part, upon power costs associated with defragmentation and with running the first job subsequent to defragmentation of the large partition (sufficient for running the relatively large job).

Also at step S265, job predicting machine logic in evaluation mod 304 receives calendar entries from calendar(s) of a set of user(s) of the supercomputer. These received calendar entries include expected run times for jobs included in the calendar(s) of the set of user(s). At step S265, the computation of the first cost approximation is based, at least in part, on the received calendar entries because these calendar entries can help determine the cost that not defragmenting will have with respect to delay and/or disruption of the large job. Furthermore, with a projection of large job submission, an estimate may be made of energy savings accrued by the powering down of partitions freed by early defragmentation in anticipation of large job submission. Similarly, the computation of the second cost approximation is based, at least in part, on the received calendar entries because this helps provide an appropriate basis of comparison for comparing the first (defragmented) and second (undefragmented) cost approximations.

At step S265, evaluation mod 304 further computes an expected time for a need for machine defragmentation, with the first expected time being based, at least in part, on a projected unavailability, due to machine fragmentation. In other words, defragmentation will occur in the resource set of supercomputer 400 at some point, even without regard to defragmentation which may be occasioned by the large job. It is helpful to know this expected time for defragmentation, because it may render superfluous and unnecessary the need to defragment especially for the large job. In particular, defragmentation is deemed unnecessary if the energy cost of defragmenting exceeds the opportunity cost savings, plus any energy savings accrued by powering down unused partitions in the defragmented machine. At step S265, evaluation mod 304 further computes: (i) a delay cost incurred for expected delay of the first job based, at least in part, on the expected time for a need for machine defragmentation; and (ii) a maximum expected runtime interval based upon the following: (a) an assumption that the supercomputer is in a defragmented state with free partitions Pn of various sizes resulting from defragmentation that has been performed prior to the expected time for a need for machine defragmentation; and (b) a projected submission of a plurality of jobs (for example, jobs gleaned from calendar entries of supercomputer users) prior to the expected time for a need for machine defragmentation. If the maximum expected runtime interval goes beyond the expected time for a need for machine defragmentation, then the maximum expected runtime interval is decreased so that the maximum expected runtime results in an interval that coincides with the expected time for a need for machine defragmentation. It should be noted that the expected runtime interval is then simply an interval of time prior to the need for machine defragmentation when certain defragmented partitions are free and available for powering down. The computation of the first cost approximation is based, at least in part, on a cost of power required for defragmentation, and the computation of the first cost approximation is further based, at least in part, upon a cost savings realized by an assumption that the free partitions of various sizes are powered down during the maximum expected runtime interval.

Processing proceeds to step S270, where defrag mod 306 defragments the jobs on the processor-based computing resources so that the jobs have a new fragmentation state. The new fragmentation state will usually include fewer, and larger, job fragments than the pre-defragmentation fragmentation state. In this embodiment, defragmentation is accomplished specifically by checkpointing and restarting, as discussed above. In this example, the defragmentation clears a first partition of any and all job fragments, as was previously contemplated when it was determined that the defragmentation condition was met by the current defragmentation state at step S265. This means that the first partition can be set into a low power state, as discussed above (although this step is not separately shown in the flow chart of FIG. 4).

After the defragmentation of step S270, processing loops back to the "normal operations" of step S255.

The following paragraphs set forth some definitions for certain words or terms for purposes of understanding and/or interpreting this document.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Job: any set of data and/or instructions that is designed to: (i) be performed by a "processor-based computing resource;" and (ii) be snapshotted and restarted (on the same computing resource or on a different computing resource) based on the snapshot; the foregoing definition of the word "job" may include some data sets which are conventionally considered as a group of multiple jobs, or as a portion of a single job; examples of jobs include the following: (i) simulations; (ii) matrix factorizations; (iii) parameter estimations; and (iv) optimizations.

Job fragments: any portion of a "job" that results from job fragmentation; multiple job fragments may be combined to form a "larger job fragment"; a single "job fragment" may be sub-divided to generate multiple "smaller job fragments."

Energy consideration: any energy related consideration, or factor, or imperative, that is affected by the distribution and/or size of jobs fragments among, and/or between, a set of processor-based computing resources of a supercomputer.

Processor-based computing resources: computing resources that are designed primarily to process data, rather than designed primarily to save data, store data and/or provide other computer related functionality; additionally, a processor-based computing resource have sufficient capacity with respect to "job fragments," such that the processor-based computing resource is susceptible to being meaningfully defragmented.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   receiving, by job predicting machine logic, a plurality of input calendar entries from calendar(s) of a set of user(s) of a supercomputer, with the plurality of input calendar entries including expected run times for jobs included in a calendar(s) of a set of user(s);
   computing, by the job predicting machine logic, a first cost approximation associated with running a first job from a plurality of jobs on a supercomputer, with the computation of the first cost approximation being performed under an assumption that no defragmentation is performed prior to running the first job, wherein the computation of the first cost approximation is based, at least in part, upon the plurality of input calendar entries and power costs associated with running the first job without the defragmentation, and wherein the first cost approximation includes a computed expected delay cost;
   computing, by the job predicting machine logic, a second cost approximation associated with running the first job on the supercomputer, with the computation of the second cost approximation being performed under an assumption that defragmentation of a first partition of the supercomputer is performed prior to running the first job, wherein the computation of the second cost approximation is based, at least in part, upon the plurality of input calendar entries and power costs associated with the defragmentation and with running the first job subsequent to the defragmentation of the first partition; and
   on condition that the first cost approximation is greater than the second cost approximation, performing defragmentation of the first partition;
   wherein the first partition is a partition large enough to run the first job.

2. The method of claim 1 further comprising:
   subsequent to performing the defragmentation of the first partition, performing the first job on the supercomputer.

3. The method of claim 1 further comprising:
   computing an expected time for a need for machine defragmentation, with the first expected time being based, at least in part, on a projected unavailability, due to the machine fragmentation;
   computing a delay cost incurred for expected delay of the first job based, at least in part, on the expected time for the need for machine defragmentation; and
   computing a maximum expected runtime interval based upon the following: (i) an assumption that the supercomputer is in a defragmented state with free partitions Pn of various sizes because defragmentation is performed prior to the expected time for the need for machine defragmentation, and (ii) a projected submission of the plurality of jobs prior to the expected time for the need for machine defragmentation;
   wherein if the maximum expected runtime interval goes beyond the expected time for the need for machine defragmentation, then the maximum expected runtime interval is decreased so that the maximum expected runtime results in an interval that coincides with the expected time for the need for machine defragmentation.

4. The method of claim 3 wherein:
   the computation of the first cost approximation is based, at least in part, on a cost of power required for the defragmentation; and
   the computation of the first cost approximation is further based, at least in part, upon a cost savings realized by an assumption that the free partitions of various sizes are powered down during the maximum expected runtime interval.

5. A computer program product comprising a computer readable storage medium having stored thereon:
   first program instructions programmed to receive, by job predicting machine logic, a plurality of input calendar entries from calendar(s) of a set of user(s) of a supercomputer, with the plurality of input calendar entries including expected run times for jobs included in a calendar(s) of a set of user(s);
   second program instructions programmed to compute, by job predicting machine logic, a first cost approximation associated with running a first job from a plurality of jobs on a supercomputer, with the computation of the first cost approximation being performed under an assumption that no defragmentation is performed prior to running the first job, wherein the computation of the first cost approximation is based, at least in part, upon the plurality of input calendar entries and power costs associated with running the first job without the defragmentation, and wherein the first cost approximation includes a computed expected delay cost;
   third program instructions programmed to compute, by the job predicting machine logic, a second cost approximation associated with running the first job on the supercomputer, with the computation of the second cost approximation being performed under an assumption that defragmentation of a first partition of the supercomputer is performed prior to running the first job, wherein the computation of the second cost approximation is based, at least in part, upon the plurality of input calendar entries and power costs associated with the defragmentation and with running the first job subsequent to the defragmentation of the first partition; and fourth program instructions programmed to on condition that the first cost approximation is greater than the second cost approximation, perform defragmentation of the first partition;

wherein:

the first partition is a partition large enough to run the first job.

6. The product of claim 5 wherein the medium has further stored thereon:

fifth program instructions programmed to subsequent to performing the defragmentation of the first partition, perform the first job on the supercomputer.

7. The product of claim 5 wherein the medium has further stored thereon:

fifth program instructions programmed to compute an expected time for a need for machine defragmentation, with the first expected time being based, at least in part, on a projected unavailability, due to the machine fragmentation;

sixth program instructions programmed to compute a delay cost incurred for expected delay of the first job based, at least in part, on the expected time for the need for machine defragmentation; and seventh program instructions programmed to compute a maximum expected runtime interval based upon the following: (i) an assumption that the supercomputer is in a defragmented state with free partitions Pn of various sizes because defragmentation is performed prior to the expected time for the need for machine defragmentation, and (ii) a projected submission of the plurality of jobs prior to the expected time for the need for machine defragmentation;

wherein if the maximum expected runtime interval goes beyond the expected time for the need for machine defragmentation, then the maximum expected runtime interval is decreased so that the maximum expected runtime results in an interval that coincides with the expected time for the need for machine defragmentation.

8. The product of claim 7 wherein:

the second program instructions are further programmed to compute the first cost approximation based, at least in part, on a cost of power required for defragmentation; and the second program instructions are further programmed to compute the first cost approximation further based, at least in part, upon a cost savings realized by an assumption that the free partitions of various sizes are powered down during the maximum expected runtime interval.

9. A computer system comprising:

a processor(s) set; and a computer readable storage medium;

wherein:

the processor set is structured, located, connected and/or programmed to run program instructions stored on the computer readable storage medium; and the program instructions include:

first program instructions programmed to receive, by job predicting machine logic, a plurality of input calendar entries from calendar(s) of a set of user(s) of a supercomputer, with the plurality of input calendar entries including expected run times for jobs included in a calendar(s) of a set of user(s);

second program instructions programmed to compute, by job predicting machine logic, a first cost approximation associated with running a first job from a plurality of jobs on a supercomputer, with the computation of the first cost approximation being performed under an assumption that no defragmentation is performed prior to running the first job, wherein the computation of the first cost approximation is based, at least in part, upon the plurality of input calendar entries and power costs associated with running the first job without the defragmentation, and wherein the first cost approximation includes a computed expected delay cost, third program instructions programmed to compute, by the job predicting machine logic, a second cost approximation associated with running the first job on the supercomputer, with the computation of the second cost approximation being performed under an assumption that defragmentation of a first partition of the supercomputer is performed prior to running the first job, wherein the computation of the second cost approximation is based, at least in part, upon the plurality of input calendar entries and power costs associated with the defragmentation and with running the first job subsequent to the defragmentation of the first partition, and fourth program instructions programmed to on condition that the first cost approximation is greater than the second cost approximation, perform defragmentation of the first partition;

wherein:

the first partition is a partition large enough to run the first job.

10. The system of claim 9 wherein the medium has further stored thereon:

fifth program instructions programmed to subsequent to performing the defragmentation of the first partition, perform the first job on the supercomputer.

11. The system of claim 9 wherein the medium has further stored thereon:

fifth program instructions programmed to compute an expected time for a need for machine defragmentation, with the first expected time being based, at least in part, on a projected unavailability, due to the machine fragmentation;

sixth program instructions programmed to compute a delay cost incurred for expected delay of the first job based, at least in part, on the expected time for the need for machine defragmentation; and seventh program instructions programmed to compute a maximum expected runtime interval based upon the following: (i) an assumption that the supercomputer is in a defragmented state with free partitions Pn of various sizes because defragmentation is performed prior to the expected time for the need for machine defragmentation, and (ii) a projected submission of the plurality of jobs prior to the expected time for the need for machine defragmentation;

wherein if the maximum expected runtime interval goes beyond the expected time for the need for machine defragmentation, then the maximum expected runtime interval is decreased so that the maximum expected runtime results in an interval that coincides with the expected time for the need for machine defragmentation.

12. The system of claim 11 wherein:
the second program instructions are further programmed to compute the first cost approximation based, at least in part, on a cost of power required for the defragmentation; and
the second program instructions are further programmed to compute the first cost approximation further based, at least in part, upon a cost savings realized by an assumption that the free partitions of various sizes are powered down during the maximum expected runtime interval.

* * * * *